United States Patent
Paige et al.

(10) Patent No.: US 10,648,352 B2
(45) Date of Patent: May 12, 2020

(54) TURBINE BLADE SEALING STRUCTURE

(71) Applicant: General Electric Company, Schenectady, NY (US)

(72) Inventors: Anthony Reid Paige, Cincinnati, OH (US); Paul Izon, Cincinnati, OH (US); Michael Verrilli, Cincinnati, OH (US); Mark Willard Marusko, Cincinnati, OH (US); Mark Eugene Noe, Cincinnati, OH (US); Joshua Brian Jamison, Cincinnati, OH (US); Andrew John Breslin, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 537 days.

(21) Appl. No.: 14/411,523

(22) PCT Filed: Jun. 13, 2013

(86) PCT No.: PCT/US2013/045635
§ 371 (c)(1),
(2) Date: Dec. 29, 2014

(87) PCT Pub. No.: WO2014/004098
PCT Pub. Date: Jan. 3, 2014

(65) Prior Publication Data
US 2015/0192027 A1    Jul. 9, 2015

Related U.S. Application Data

(60) Provisional application No. 61/666,806, filed on Jun. 30, 2012.

(51) Int. Cl.
*F01D 11/00* (2006.01)
*F01D 5/28* (2006.01)
*B29L 31/08* (2006.01)

(52) U.S. Cl.
CPC ............ *F01D 11/006* (2013.01); *F01D 5/282* (2013.01); *B29L 2031/08* (2013.01); *F05D 2240/80* (2013.01); *F05D 2300/6033* (2013.01)

(58) Field of Classification Search
CPC .......... F01D 5/282; F01D 5/30; F01D 5/3007; F01D 11/001; F01D 11/005; F01D 11/008; F01D 11/006
See application file for complete search history.

(56) References Cited

U.S. PATENT DOCUMENTS

| 3,181,835 A | 5/1965 | Davis |
| 3,501,090 A | 3/1970 | Stoffer et al. |
| (Continued) | | |

FOREIGN PATENT DOCUMENTS

| CN | 1060890 A | 5/1992 |
| CN | 1550642 A | 12/2004 |
| (Continued) | | |

OTHER PUBLICATIONS

International Search Report and Written Opinion issued in connection with corresponding WO application PCT/US2013/045635 dated Sep. 12, 2013.

(Continued)

*Primary Examiner* — Justin D Seabe
*Assistant Examiner* — Cameron A Corday
(74) *Attorney, Agent, or Firm* — Dority & Manning, P.A.

(57) ABSTRACT

A turbine blade sealing structure for a ceramic matrix composite component is provided. The turbine sealing structure includes at least one top ply abutting a top portion of a shank. The at least one top ply extends out over the top portion of the shank. The turbine sealing structure includes at least one side ply abutting a side portion of the shank. The at least one side ply extends along a side portion of the shank. The at least one top ply and at least one side ply form (Continued)

an angel wing and a skirt with on the shank of the ceramic matrix composite component.

20 Claims, 16 Drawing Sheets

(56) References Cited

U.S. PATENT DOCUMENTS

| | | | |
|---|---|---|---|
| 3,801,222 A * | 4/1974 | Violette | F01D 5/3007 416/193 A |
| 3,887,298 A | 6/1975 | Hess et al. | |
| 4,872,812 A | 10/1989 | Hendley et al. | |
| 5,205,713 A | 4/1993 | Szpunar et al. | |
| 5,261,790 A | 11/1993 | Dietz et al. | |
| 5,281,097 A | 1/1994 | Wilson et al. | |
| 5,284,421 A | 2/1994 | Chlus et al. | |
| 5,478,207 A | 12/1995 | Stec | |
| 5,749,705 A | 5/1998 | Clarke et al. | |
| 5,785,499 A | 7/1998 | Houston et al. | |
| 5,820,346 A | 10/1998 | Young et al. | |
| 6,171,058 B1 | 1/2001 | Stec | |
| 6,299,410 B1 | 10/2001 | Hilbert et al. | |
| 6,354,803 B1 | 3/2002 | Grover et al. | |
| 6,506,016 B1 | 1/2003 | Want | |
| 6,932,575 B2 | 8/2005 | Surace et al. | |
| 7,097,429 B2 | 8/2006 | Athans et al. | |
| 7,121,800 B2 | 10/2006 | Beattie | |
| 7,121,801 B2 | 10/2006 | Surace et al. | |
| 7,306,826 B2 | 12/2007 | Subramanian et al. | |
| 7,322,797 B2 | 1/2008 | Lee et al. | |
| 7,374,400 B2 | 5/2008 | Boswell | |
| 7,467,924 B2 | 12/2008 | Charbonneau et al. | |
| 7,510,379 B2 * | 3/2009 | Marusko | F01D 5/282 29/889.7 |
| 7,513,379 B2 | 4/2009 | Gerard et al. | |
| 8,206,096 B2 * | 6/2012 | Prentice | F01D 5/282 415/191 |
| 8,714,932 B2 * | 5/2014 | Noe | C04B 35/573 156/280 |
| 9,022,733 B2 | 5/2015 | Coupe et al. | |
| 2004/0228731 A1 | 11/2004 | Lagrange et al. | |
| 2005/0158171 A1 | 7/2005 | Carper et al. | |
| 2007/0072007 A1 | 3/2007 | Carper et al. | |
| 2008/0298969 A1 * | 12/2008 | Bunker | F01D 5/081 416/182 |
| 2009/0010762 A1 | 1/2009 | Caucheteux et al. | |
| 2009/0257875 A1 | 10/2009 | McCaffrey et al. | |
| 2010/0172760 A1 | 7/2010 | Ammann | |
| 2010/0232938 A1 | 9/2010 | Harris, Jr. et al. | |
| 2011/0027098 A1 | 2/2011 | Noe et al. | |
| 2012/0055609 A1 | 3/2012 | Blanchard et al. | |
| 2012/0163985 A1 | 6/2012 | Darkins, Jr. et al. | |
| 2014/0322024 A1 | 10/2014 | Watanabe | |

FOREIGN PATENT DOCUMENTS

| | | |
|---|---|---|
| CN | 1749531 A | 3/2006 |
| CN | 101294501 A | 10/2008 |
| EP | 0475428 A1 | 3/1992 |
| EP | 0774049 A1 | 5/1997 |
| EP | 1801354 A2 | 6/2007 |
| EP | 2392778 A2 | 12/2011 |
| EP | 2570600 A2 | 3/2013 |
| JP | 05113136 A | 5/1993 |
| JP | 08504015 A | 4/1996 |
| JP | 10196305 A | 7/1998 |
| JP | 1162502 A | 3/1999 |
| JP | 2000291407 A | 10/2000 |
| JP | 2006077759 A | 3/2006 |
| JP | 2007154898 A | 6/2007 |
| JP | 2010159748 A | 7/2010 |
| JP | 2010216474 A | 9/2010 |
| JP | 2012140935 A | 7/2012 |
| JP | 2013087663 A | 5/2013 |
| WO | WO2010116066 * | 3/2010 |
| WO | 20100077401 A2 | 7/2010 |
| WO | 2010146288 A1 | 12/2010 |
| WO | 2011005337 A1 | 1/2011 |

OTHER PUBLICATIONS

Unofficial English translation of Chinese Office Action issued in connection with corresponding CN Application No. 201380035082.7 dated Jun. 3, 2015.

U.S. Non-Final Office Action issued in connection with Related U.S. Appl. No. 13/228,142 dated May 7, 2014.

U.S. Final Office Action issued in connection with Related U.S. Appl. No. 13/228,142 dated Dec. 3, 2014.

Chinese Office Action issued in connection with Related CN Application No. 201210328349.9 dated Feb. 11, 2015.

PCT Search Report and Written Opinion issued in connection with Related PCT Application No. PCT/US2014/055205 dated May 28, 2015.

Chinese Office Action issued in connection with Related CN Application No. 201210328349.9 dated Jul. 9, 2015.

Unofficial English Translation of Japanese Office Action issued in connection with Related JP Application No. 2012195743 dated Jun. 28, 2016.

Chinese Office Action issued in connection with Related CN Application No. 201480050321.0 dated Jul. 28, 2016.

GE Related Case Form.

Unofficial English Translation of Japanese Search Report issued in connection with related JP Application No. 2016542104 dated Feb. 22, 2017.

Unofficial English Translation of Japanese Office Action issued in connection with related JP Application No. 2016542104 dated Mar. 21, 2017.

Unofficial English Translation of Japanese Office Action issued in connection with corresponding JP Application No. 2015520254 dated Apr. 4, 2017.

Anthony Reid Paige et al., U.S. Appl. No. 13/228,142, filed Sep. 8, 2011.

Chad Daniel Kleinow, U.S. Appl. No. 15/021,318, filed Mar. 11, 2016.

* cited by examiner

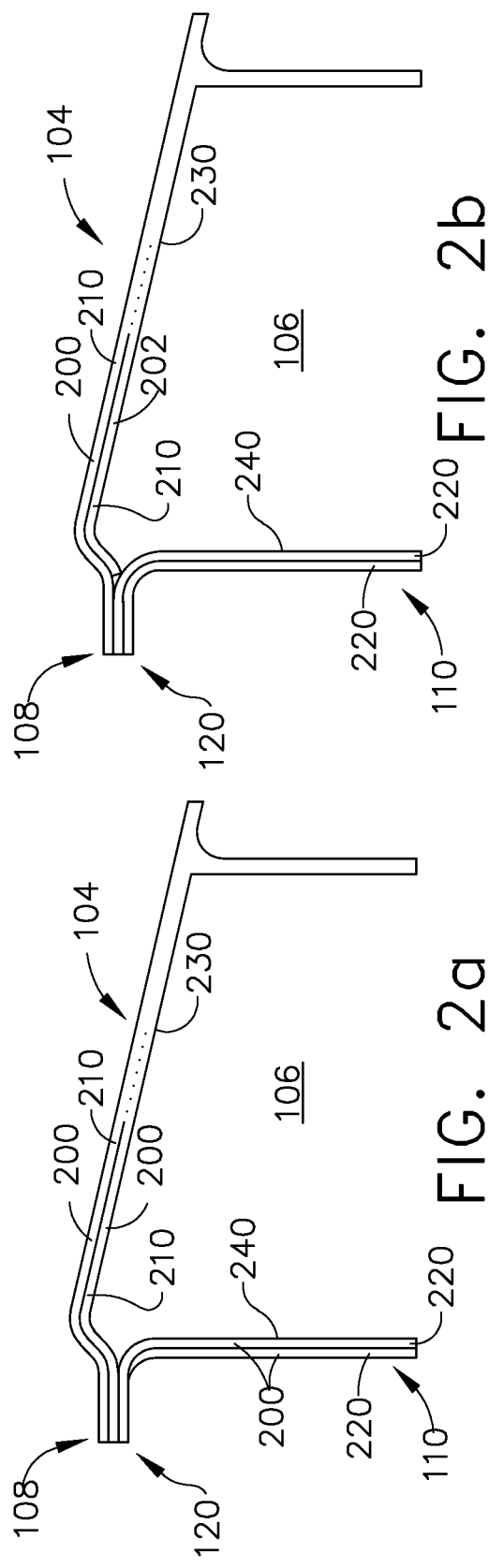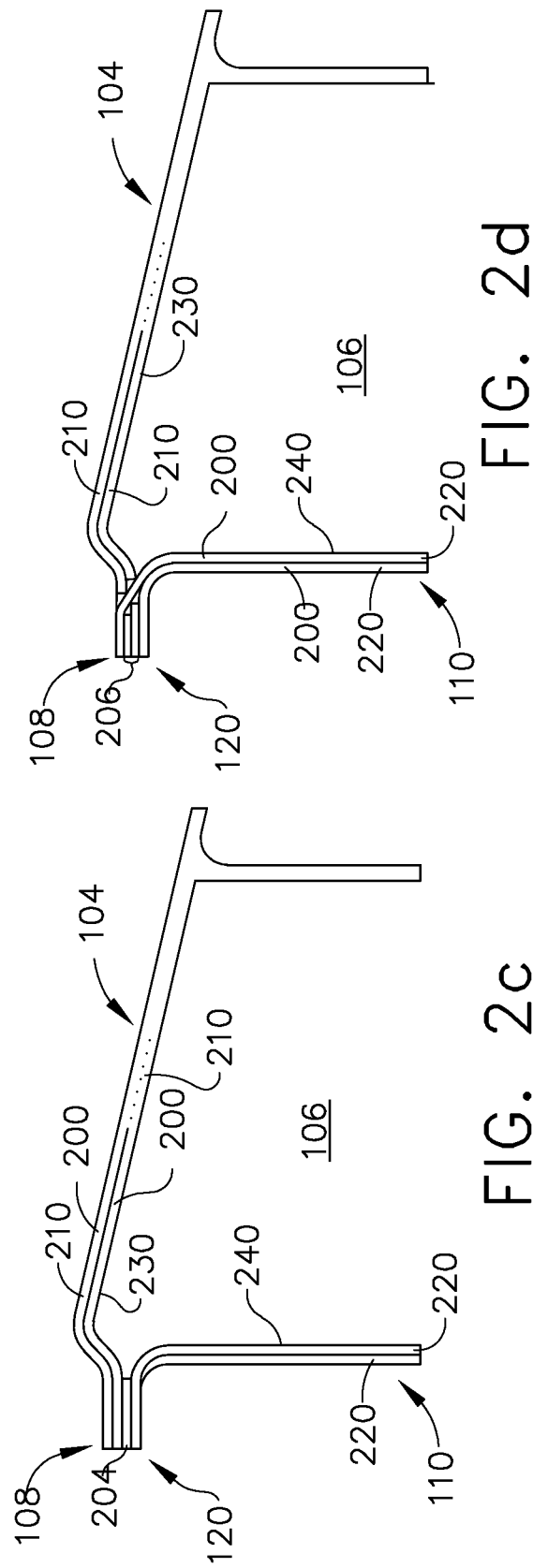

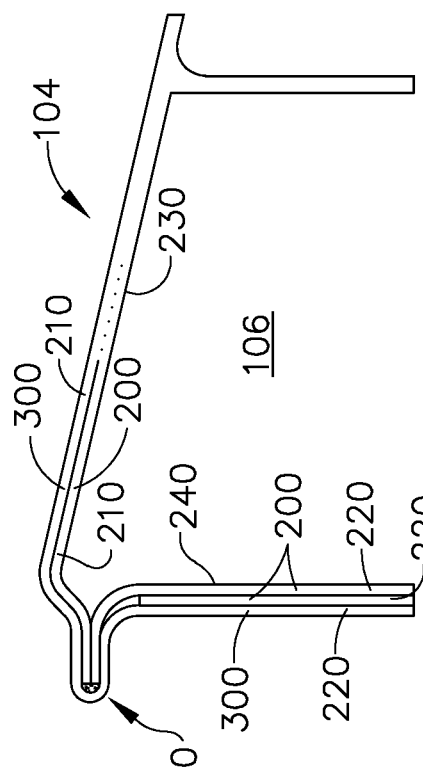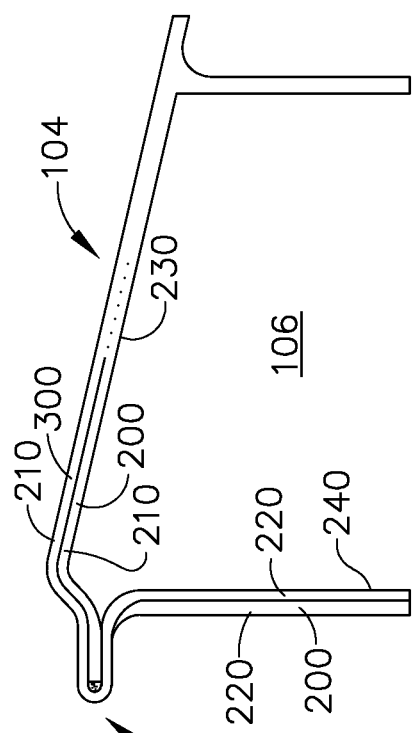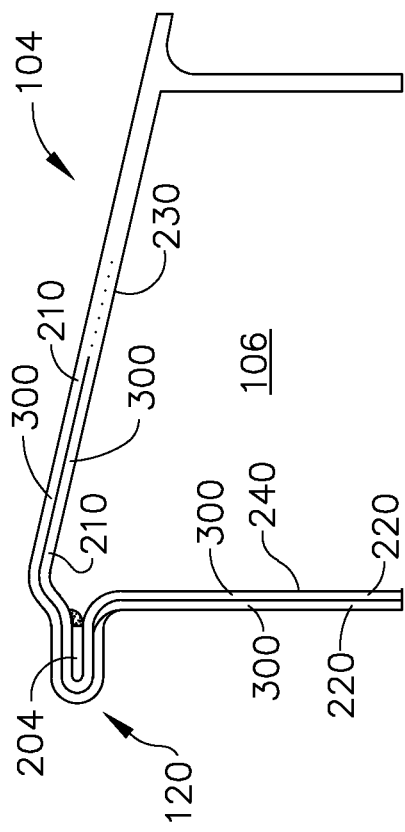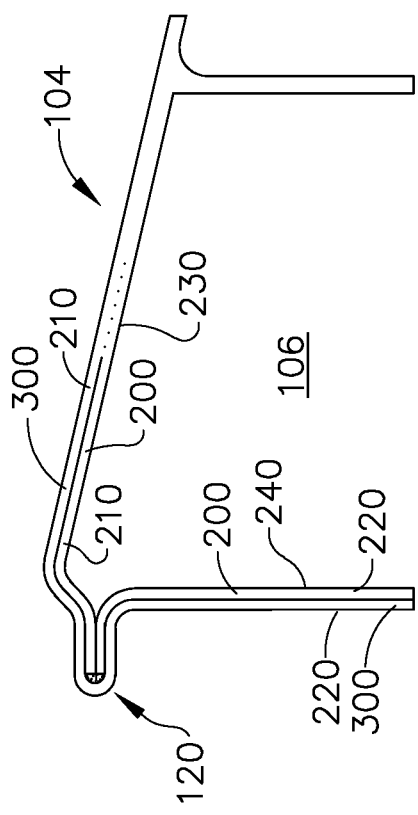
FIG. 3a
FIG. 3b
FIG. 3c
FIG. 3d

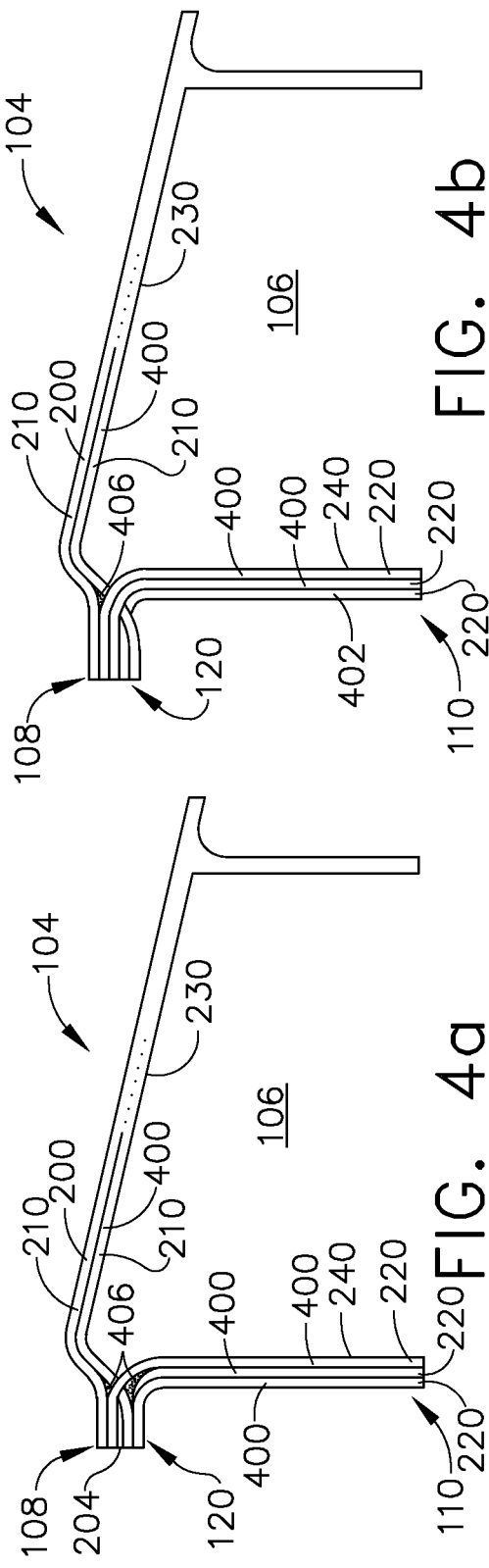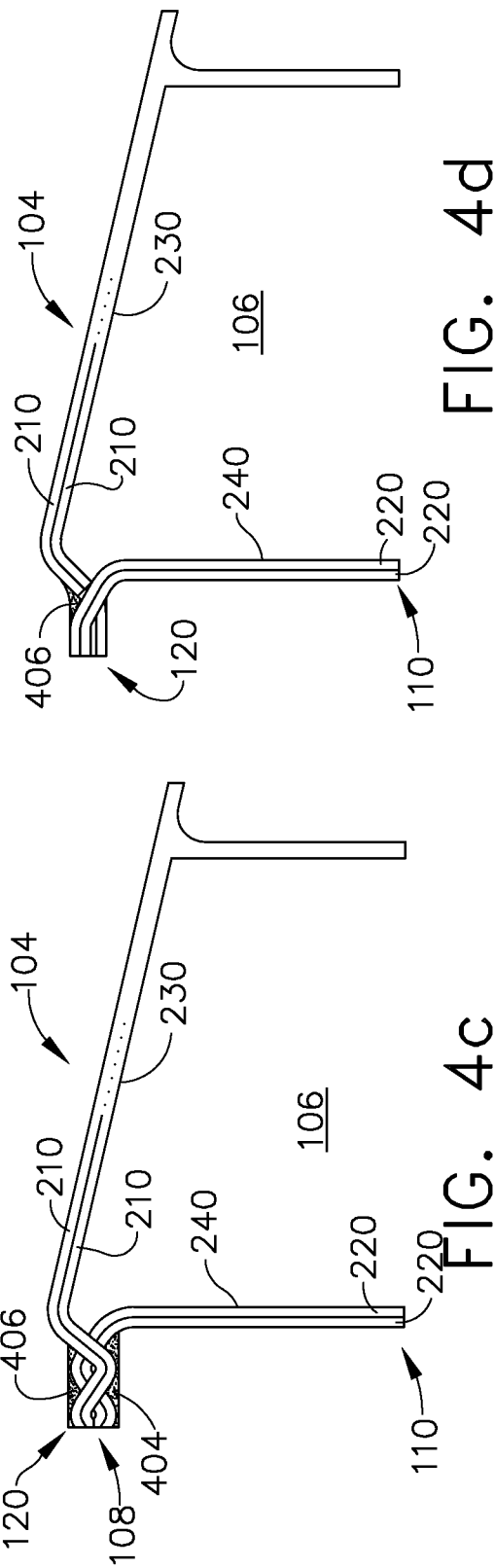

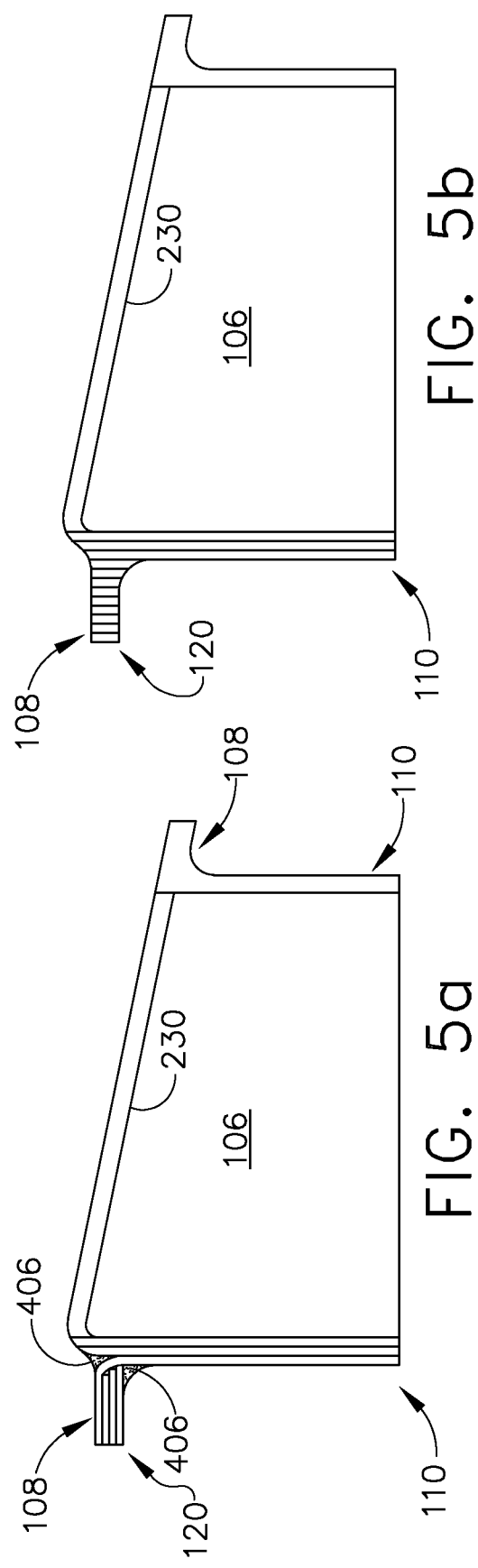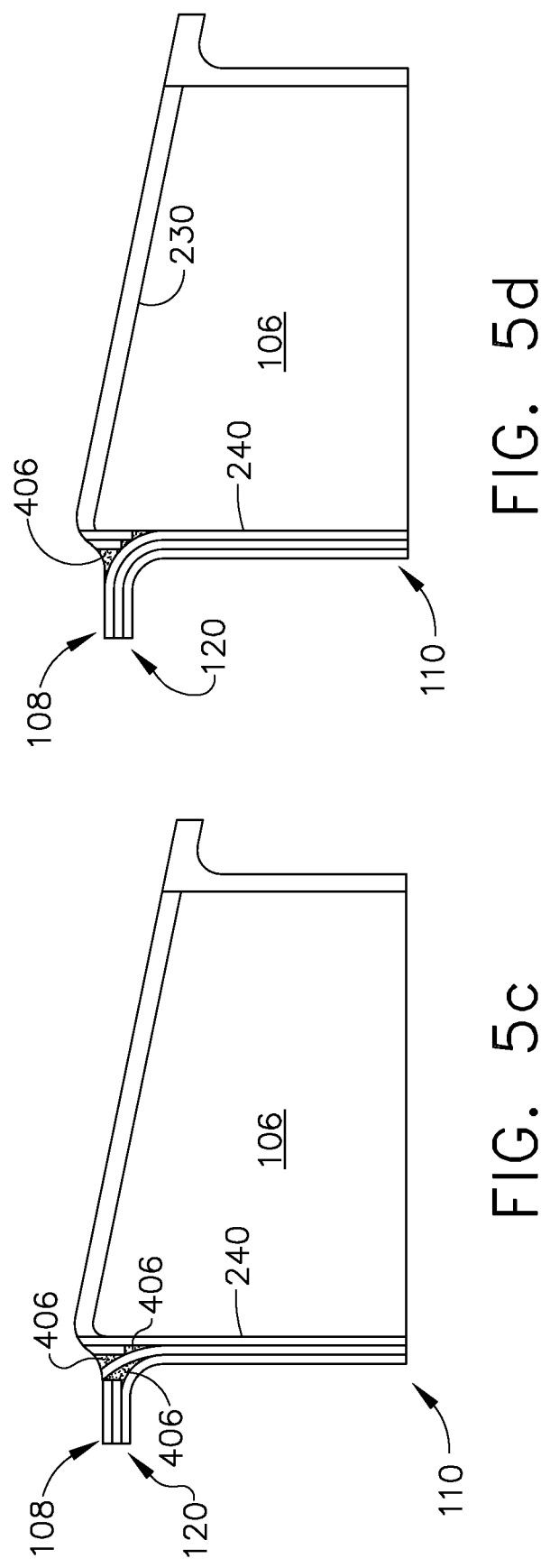

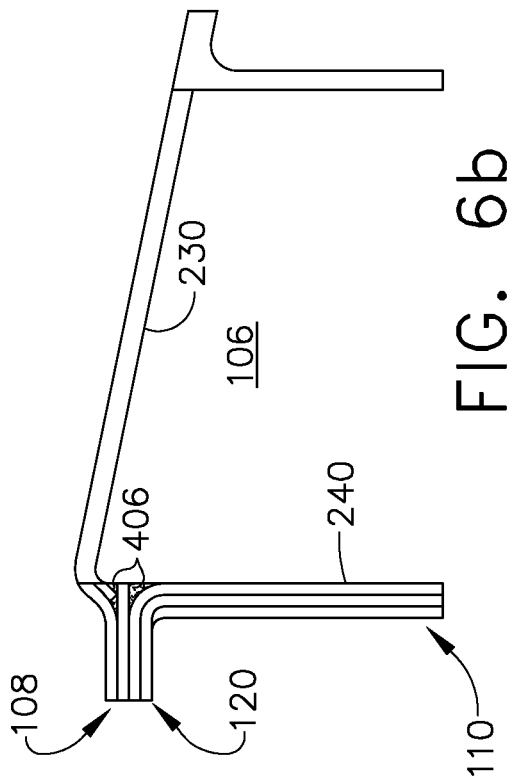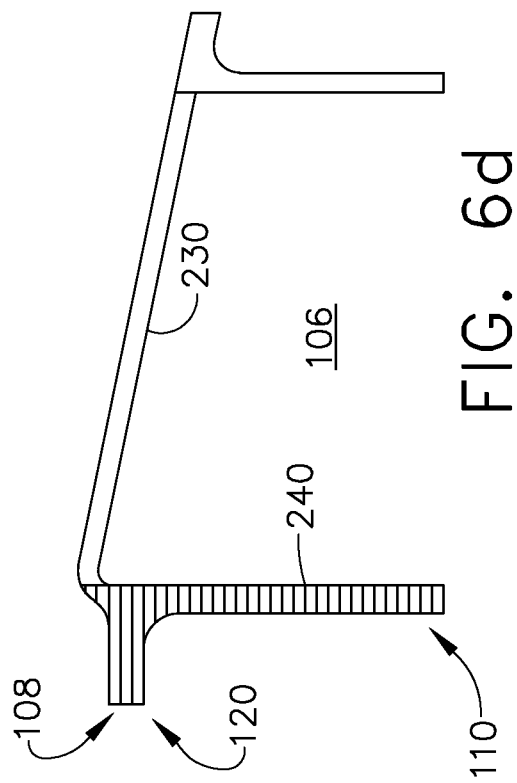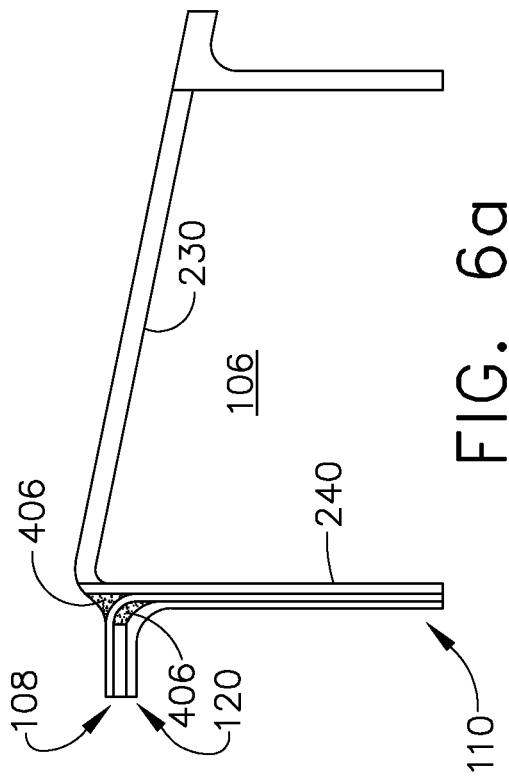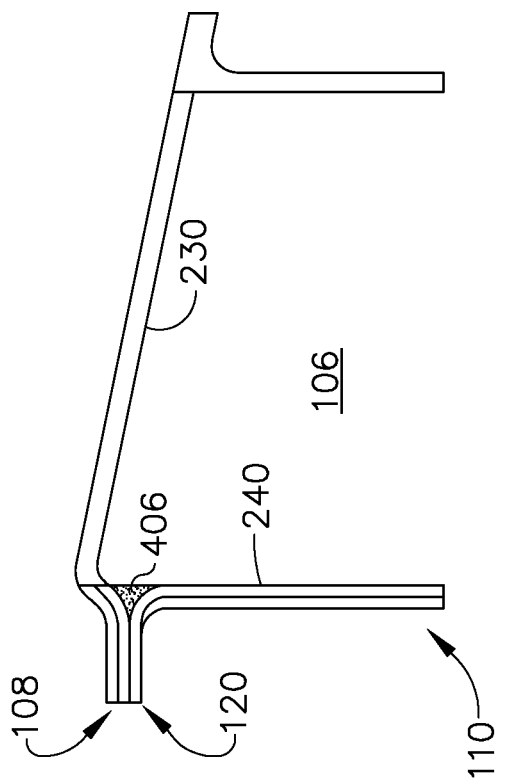

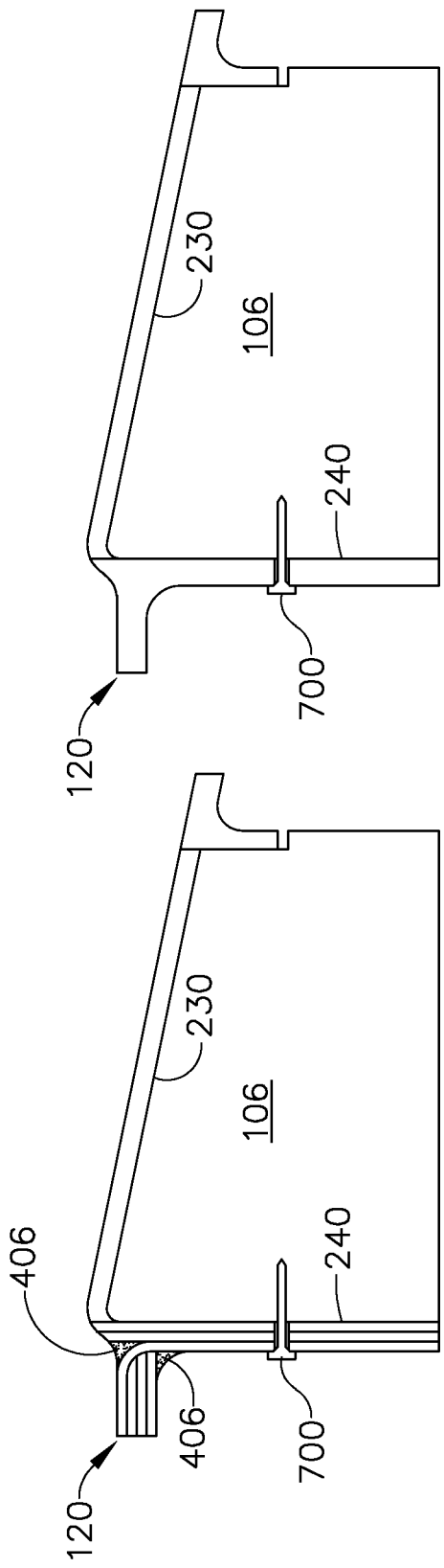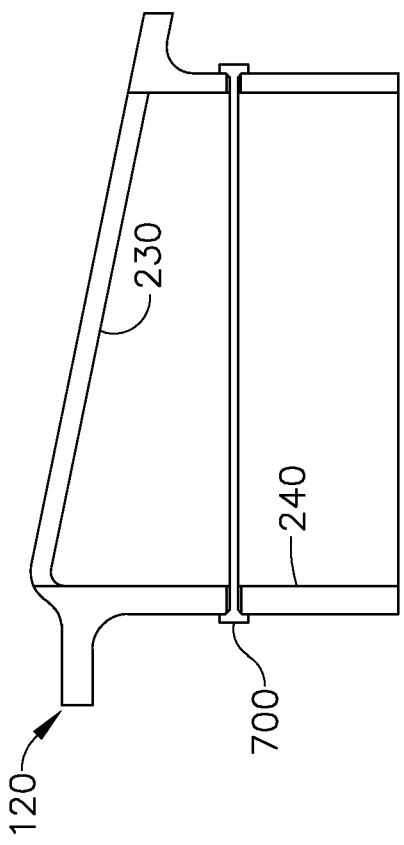

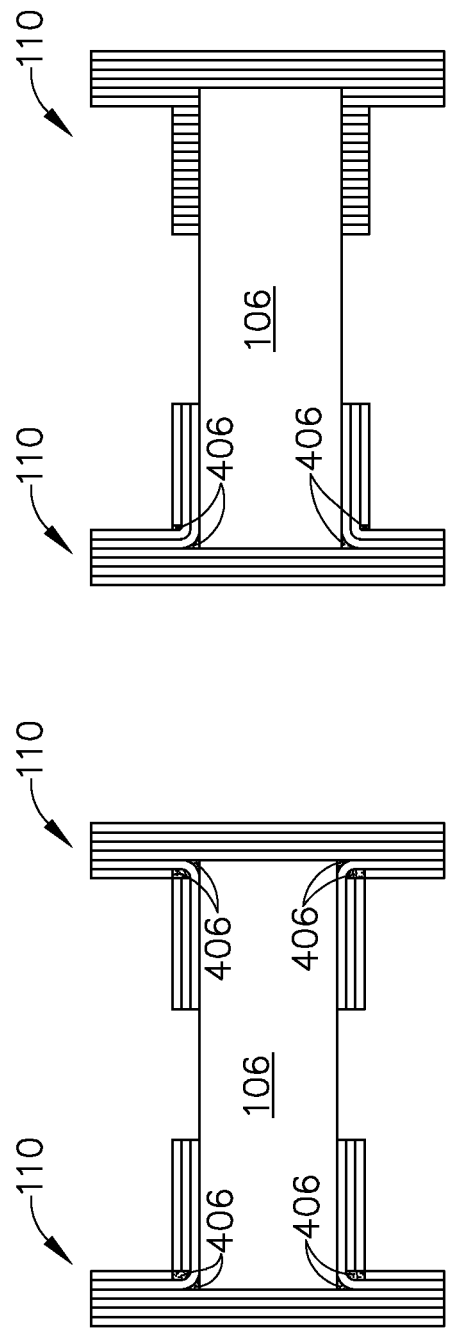
FIG. 15a
FIG. 15b
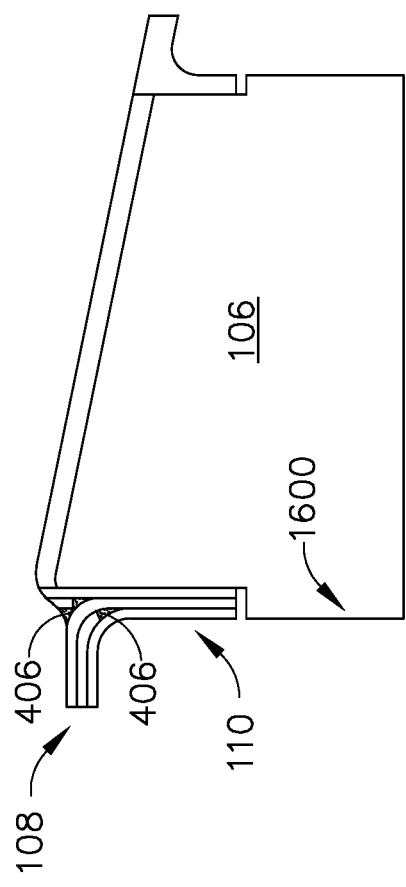
FIG. 16a

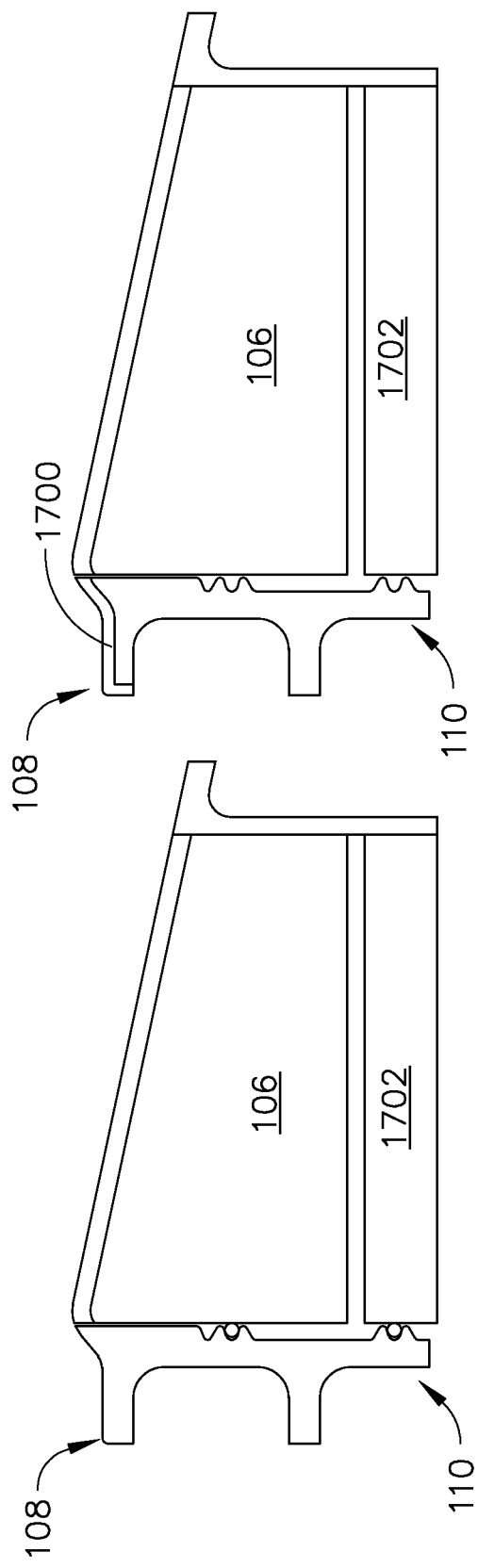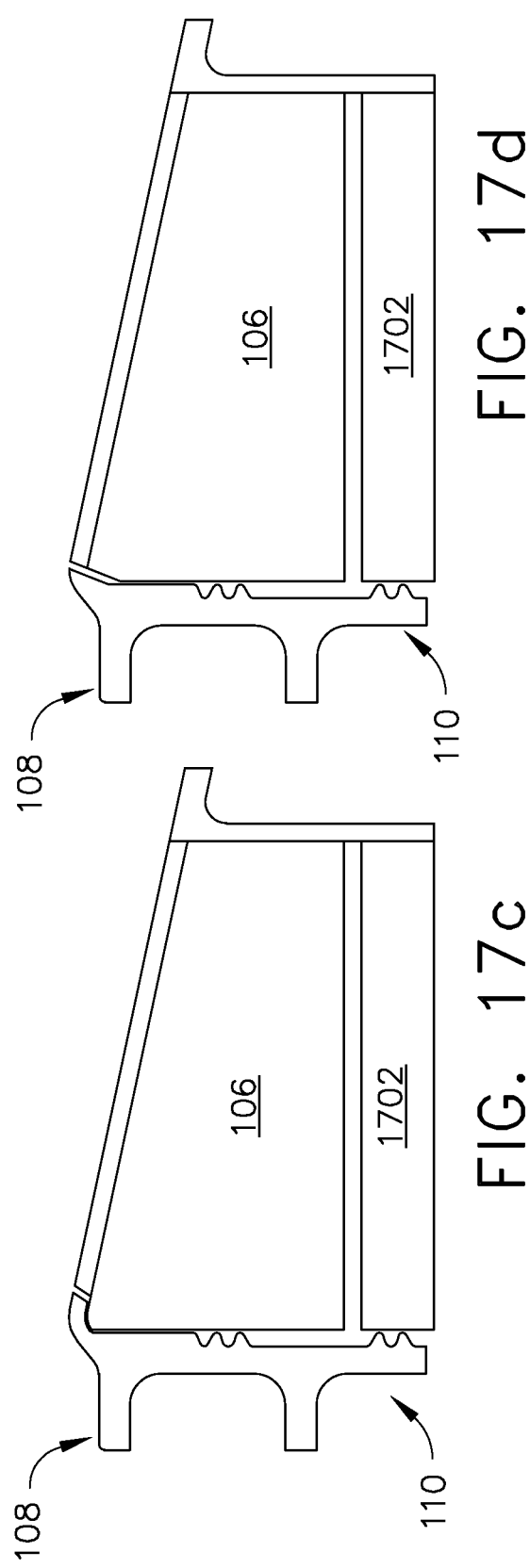

TURBINE BLADE SEALING STRUCTURE

CROSS-REFERENCE TO RELATED APPLICATIONS

This patent application claims the benefit of U.S. Provisional Patent Application Ser. No. 61/666,806 filed on Jun. 30, 2012 and entitled "ANGEL WING AND SKIRT DESIGNS AND METHODS OF MAKING," the disclosure of which is incorporated by reference as if fully rewritten herein

FIELD OF THE INVENTION

The present invention relates generally to turbines. More specifically, to a turbine blade sealing structure of an angel wing and skirt on a shank of a ceramic matrix composite component.

BACKGROUND OF THE INVENTION

Turbine blade sealing structures, for example, angel wings and skirts improve accessory hardware life by preventing exposure of the accessory hardware to hot gases, which would significantly reduce accessory hardware life. Currently, ceramic matrix composite (CMC) fan blades do not need skirts or angel wings because they operate at low enough temperatures that hot gas ingestion does not occur. As increases in efficiency are desired, designs for lighter weight and more responsive blades are being sought; as such, CMC blades are being used in harsher and higher temperature environments in the system.

As such, there is a need for angel wing and skirt designs and methods of making the angel wings and skirts for ceramic matrix composite components.

SUMMARY OF THE INVENTION

According to an exemplary embodiment of the present disclosure, a turbine blade sealing structure for a ceramic matrix composite component is provided. The turbine sealing structure includes at least one top ply abutting a top portion of a shank and extending out over the top portion of the shank. The turbine sealing structure includes at least one side ply abutting a side portion of the shank and extending along a side portion of the shank. The at least one top ply and at least one side ply form an angel wing and a skirt with on the shank of the ceramic matrix composite component.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIGS. 2a-10b are side schematic views of a ceramic matrix composite component of the present disclosure.

FIGS. 11a-15b are cross section cut views of FIG. 1 along line 11a-11a of a ceramic matrix composite component of the present disclosure.

FIG. 16a is a side schematic view of a ceramic matrix composite component of the present disclosure.

FIGS. 17a-17d are side schematic views of a ceramic matrix composite component of the present disclosure.

Wherever possible, the same reference numbers will be used throughout the drawings to represent the same parts.

DETAILED DESCRIPTION OF THE INVENTION

Provided is a turbine blade sealing structure for a ceramic matrix composite component. The turbine sealing structure includes at least one top ply abutting a top portion of a shank. The at least one top ply extends out over the top portion of the shank. The turbine sealing structure includes at least one side ply abutting a side portion of the shank. The at least one side ply extends along a side portion of the shank. The at least one top ply and at least one side ply form an angel wing and a skirt with on the shank of the ceramic matrix composite component. In one embodiment, top plies may form the angel wing and side plies may form the skirt. Generally, the angel wings provide a seal in the axial direction of the turbine rotor blade, which forms a seal by overlapping with the nozzle seal. Angel wings inhibit ingestion of hot gases from the flowpath into gas turbine wheel spaces. Skirts provide a seal in the radial direction and generally extend radially inward at an angle from the longitudinal axis. Skirts are generally configured to seal the shanks of the blades from the wheel space cavities.

One advantage of an embodiment of the present disclosure includes providing a turbine sealing structure that includes an angel wing and skirt that are more tolerant to high temperatures. Another advantage of an embodiment includes angel wings and skirts that are lower in weight than metal counterparts. Yet another advantage of an embodiment of the present disclosure is includes the ability to easily design angel wings and skirts that would not be possible is using a metallic alloy.

Figure 1:
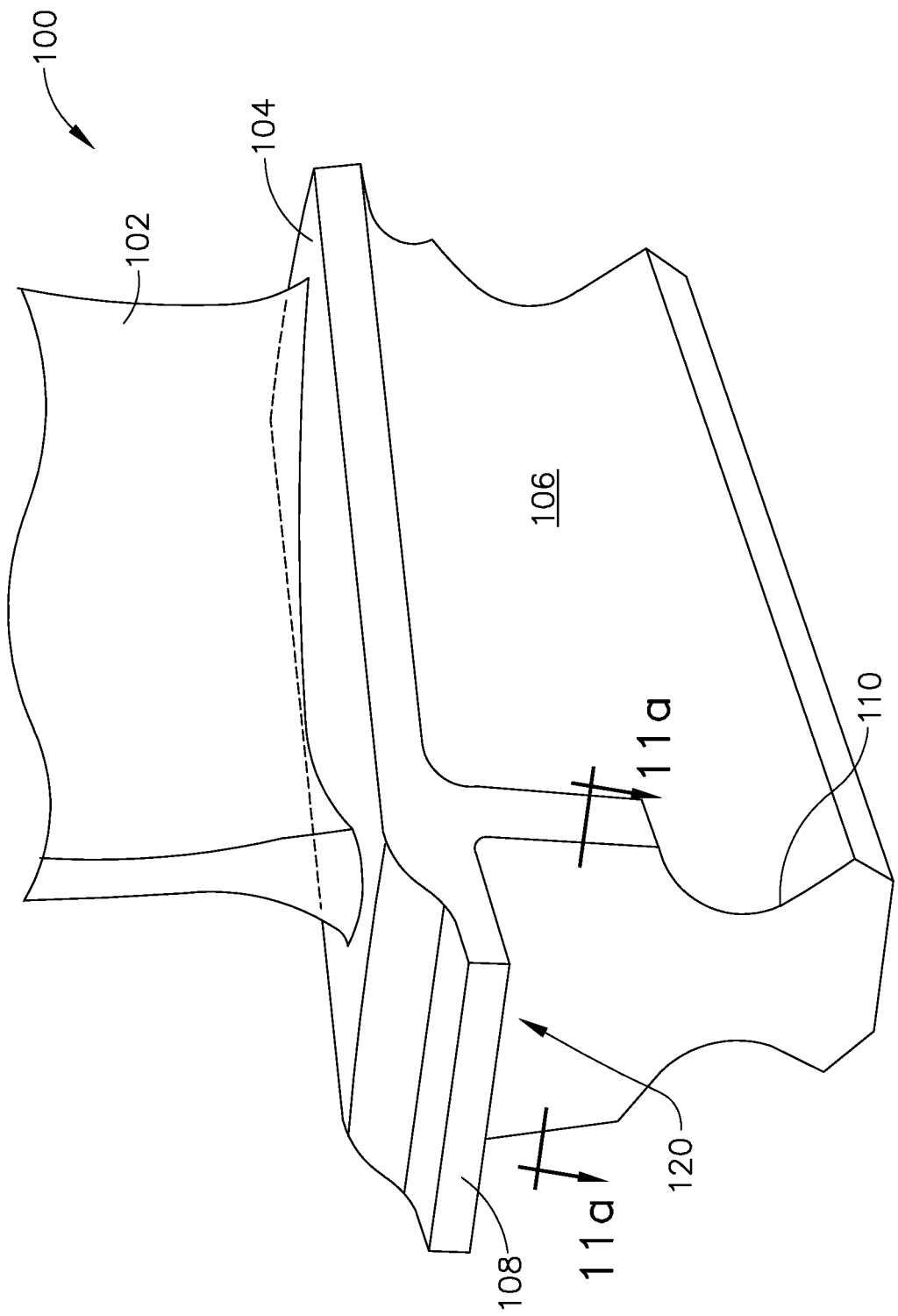
FIG. 1 is a schematic perspective view of a ceramic matrix composite component of the present disclosure.

FIG. 1 is a schematic perspective view of a ceramic matrix composite (CMC) component 100. CMC component 100 may include airfoil 102 is attached to platform 104, the platform being adjacent shank 106. Shank 106 includes a top portion 230 and a side portion 240, for example, see FIG. 2. Turbine blade sealing structures 120 for CMC components 100 include angel wing 108 and skirts 110. Angel wing 108 and skirt 110 designs may be used independently, conjunctively and interchangeably. CMC components 100 and turbine blade sealing structures 120 may be manufactured from silicon carbide fiber reinforced ceramic matrix composites, carbon fiber reinforced ceramic matrix composites, and alumina or alumina-silicate fiber reinforced oxide matrix composites. Fiber architectures for angel wings 108 and skirts 110 may be a laminates composed of unidirectional fiber reinforced lamina, woven fiber architectures, braided fiber architectures and combinations thereof.

According to one embodiment, a turbine blade sealing structure for a ceramic matrix composite component is provided. Turbine blade sealing structure may include at least one top ply abutting top portion of shank. The at least one top ply may extend out over top portion of shank. Turbine blade sealing structure may include at least one side ply abutting a side portion of the shank. The at least one side ply may extend along a side portion of the shank. The at least one top ply and at least one side ply may form an angel wing and a skirt on the shank of the ceramic matrix composite component. For example as shown in FIGS. 2a-2d, 3a-3d and 4a-4d, turbine blade sealing structure 120 may include at least one top ply 210 abutting top portion 230 of shank 106. The at least one top ply 210 may extend out over top portion 230 of shank 106. Turbine blade sealing structure 120 may include at least one side ply 220 abutting side portion 240 of shank 106. The at least one side ply 220 may extend along side portion 240 of shank 106. The at least one top ply 210 and at least one side ply 220 may form an angel wing 108 and a skirt 110 on shank 106 of ceramic matrix composite component 100.

According to one embodiment, angel wing and skirts may be laminated together and bonded against the shank. For example, as shown in FIGS. 2a-2d, angel wing 108 and skirts 110 may be laminated together and bonded against the shank 106. For example, as shown in FIG. 2a, a plurality of continuous plies 200 may be used to form angel wing 108 and skirt 110. For example, as shown in FIG. 2a, at least one top ply 210 and at least one side ply 220 may be continuous plies 200. At least one top ply 210 and at least one side ply 220 cooperate to form angel wing 108 and skirt 110 against shank 106. As shown in FIG. 2b, at least one top ply 210 may include a continuous ply 200 and a terminal ply 202 to form angel wing 108. Continuous plies 200 or terminal plies 202 may be used as side plies 220 to form skirt 110. As shown in FIG. 2c, a spacer 204 or flat tape of cloth, woven fiber architecture, or prepreg may be used to form a portion of angel wing 108 and continuous plies 200 may be used to wrap around spacer 204 and form skirt 110. As shown in FIG. 2d, an insert pack 206 of plies may be used to form angel wing 108 and continuous plies 200 may be used to wrap around insert pack 206 to laminate to shank 106. Continuous plies 200 go along side 240 and top portion 230 of shank 106 to weave together around insert pack 206. Any number of continuous plies 200 or terminal plies 202 may be used to form angel wing 108 and skirt 110.

According to one embodiment, wrapping plies may be used to create angel wings and skirts. For example, as shown in FIGS. 3a-3d wrapping plies 300 may be used to create angel wings 108 and skirts 110. Top ply 210 and side play 220 may form wrapping ply 300. Wrapping ply 300 may be adjacent top 230 and side 240 of shank 106. In FIG. 3a, a first wrapping ply 300 may be laid adjacent to shank 106 at top 230 and side 240 and a second wrapping ply 300 may be laid over the first wrapping ply to create angel wing 108 and skirt 110 of CMC component 100. In FIG. 3b, top ply 210 as continuous ply 200 may be laid on top 230 of shank 106 to form a portion of angel wing 108 and side plies 220 as two continuous plies 200 may be laid on side 240 of shank 106 to form skirt 110 and remaining portion of angel wing 108. Wrapping ply 300 may be applied to the continuous plies 200 to finish the angel wing 108 and skirt 110 design. The additional continuous ply 200 along skirt 110 may provide additional reinforcement. As shown in FIG. 3c, a first continuous ply 200 may be laid on top 230 of shank 106 to form a portion of angel wing 108. A second continuous ply 200 may be laid on side 240 of shank 106 to form a portion of skirt 110 and angel wing 108. The two continuous plies 200 may be covered with a wrapping ply 300 to finish forming angel wing 108 and skirt 110. As shown in FIG. 3d, a first continuous ply 200 may be applied as top ply 210 to top 230 of shank 106 to form portion of angel wing 108. A wrapping ply 300 as top ply 210 and side ply 220 may be applied to continuous ply 200 and to side 240 of shank 106. A second continuous ply 200 may be applied to side 240 of shank 106 over wrapping ply 300 but not over angel wing 108, thereby reinforcing skirt 110.

According to one embodiment, platform flowpath plies may be woven or braided together with skirt plies to form angel wing. For example, as shown in FIGS. 4a-d platform flowpath plies may be woven or braided together with skirt plies to form angel wing 108. Top plies 210 and side plies 220 may be weaved plies 400. As shown in FIG. 4a, top ply 210 may be applied to top 230 of shank 106 and woven with side plies 220 forming weaved plies 400. Weaved plies 400 may be applied to top 230 and side 240 of shank 106 to form skirt 110 and angel wing 108. A second top ply 210 as a continuous ply 200 may be applied to first top ply 210 as a weaved ply 400 on top 230 of shank 106 and over angel wing 108. As shown in FIG. 4b, weaved plies 400 may be used to form angel wing 108 and skirt 110, and an additional outer laminate ply or plies may be added to skirt 110 for additional reinforcement. As shown in FIG. 4c, the top plies 210 and side plies 220 plies may be braided plies 404 surrounded by matrix 406 to form angel wing 108. As shown in FIG. 4d, the plies may be woven once and may be held in place by matrix 406 to form angel wing 108 and skirt 110.

According to one embodiment, angel wing and skirt plies may be bonded to flat or side faces of shank 106 in any combination of ply arrangement. For example, as shown in FIGS. 5a-d and 6a-d angel wing and skirt plies may be bonded to flat or side faces of shank 106 in any combination of ply arrangements as shown. Angel wing 108 and skirt 110 assembly may have its own dovetail, which would make the assembly self-supporting. Matrix 406 may be used to bond angel wing 108 and skirt 110 assembly to shank 106.

Figure 8A:
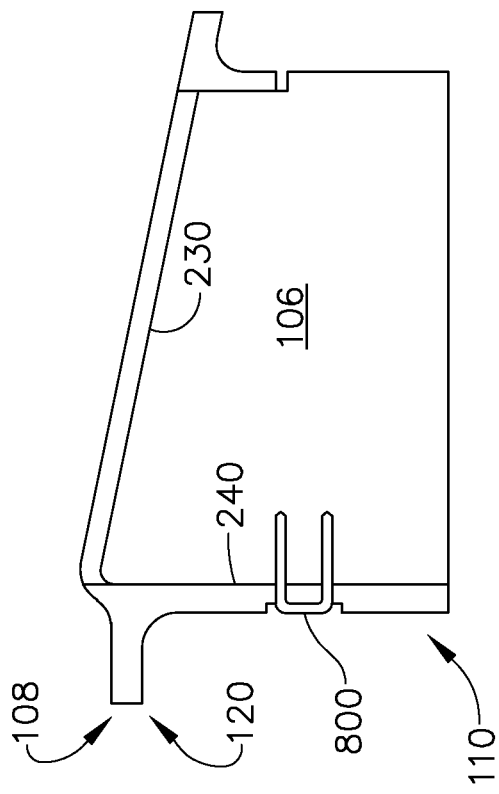
Figure 8B:
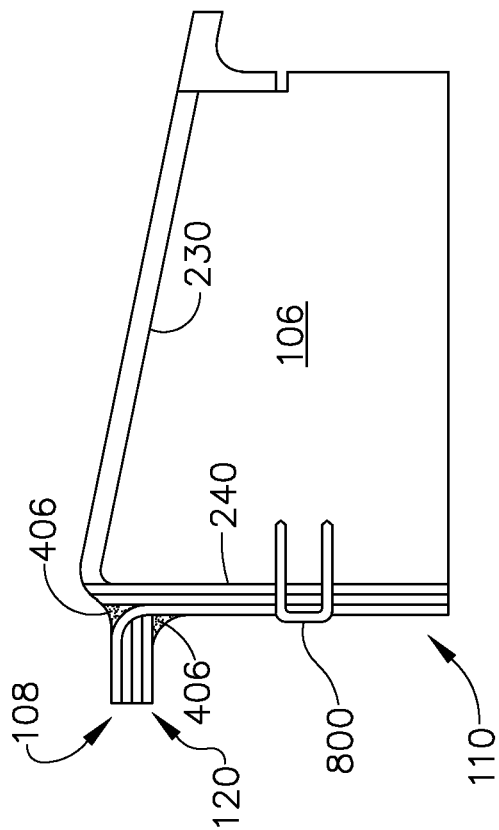
Figure 8C:
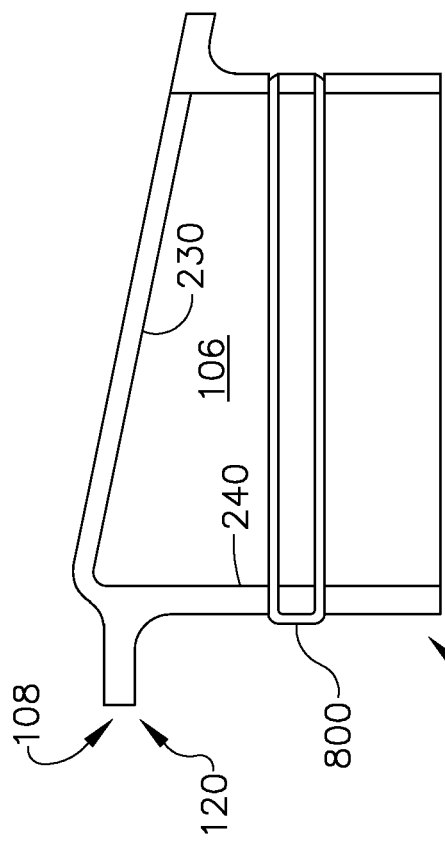
Figure 9A:
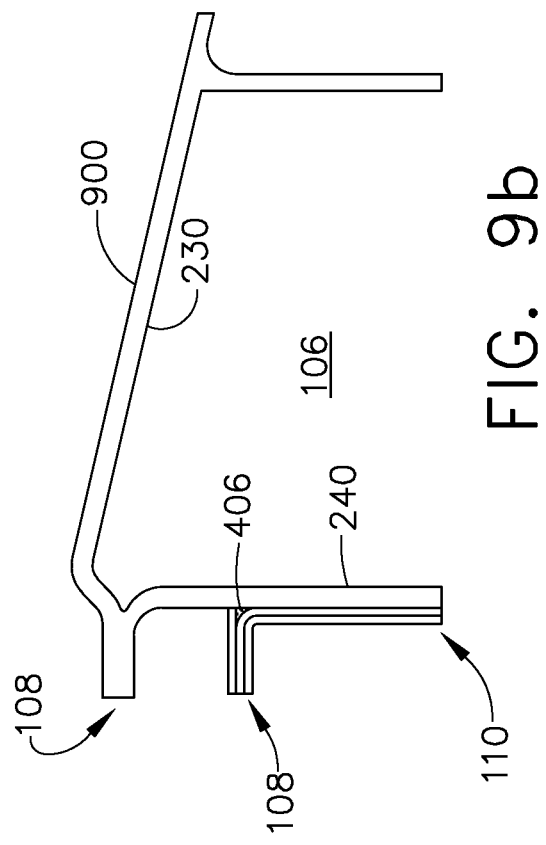
Figure 9B:
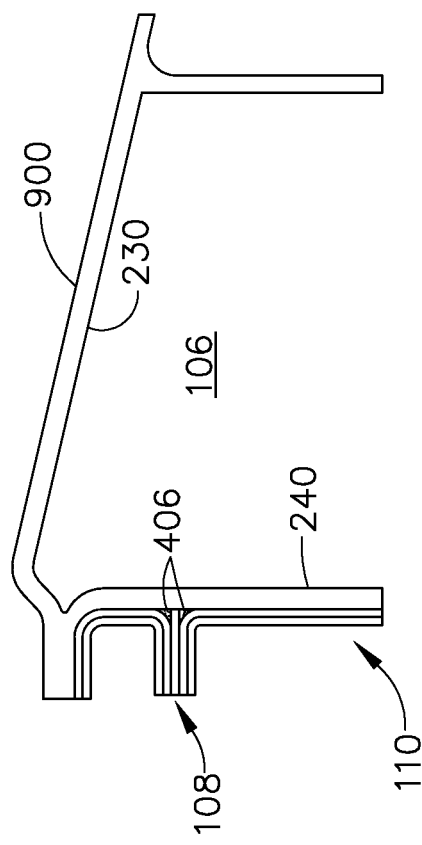
Figure 9C:
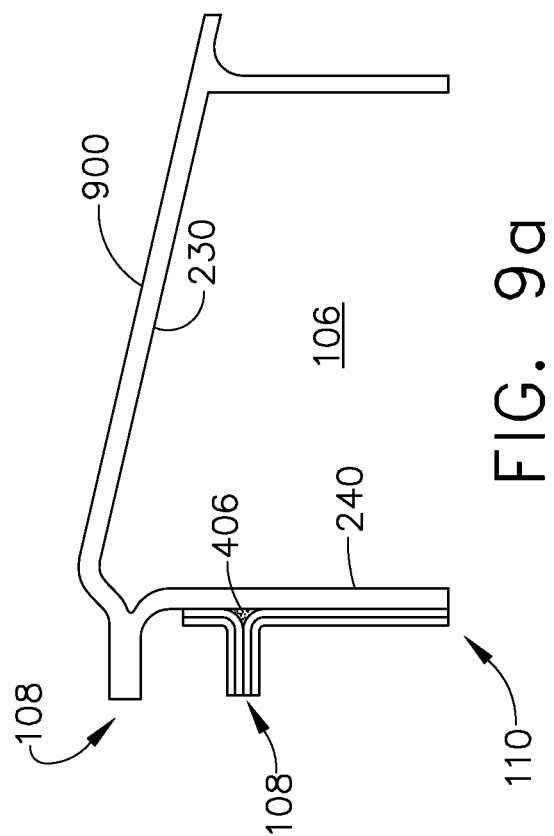
Figure 9D:
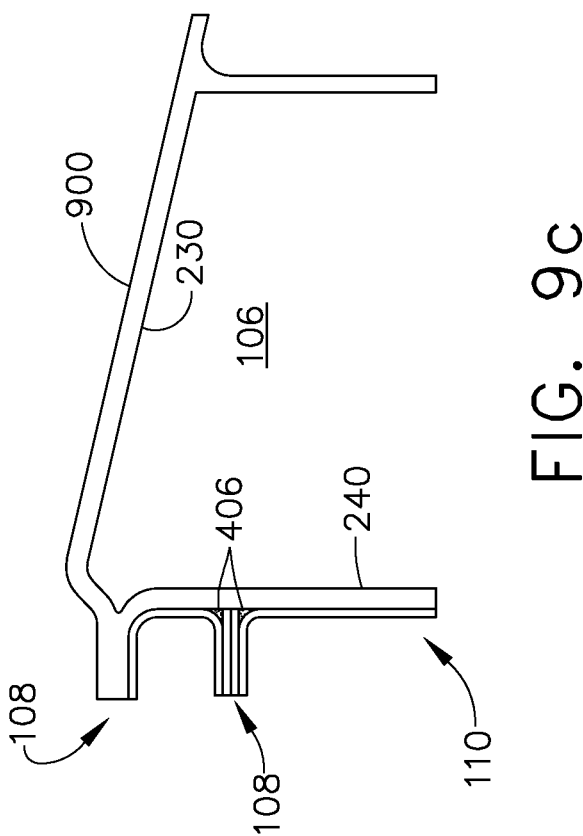
Figure 9E:
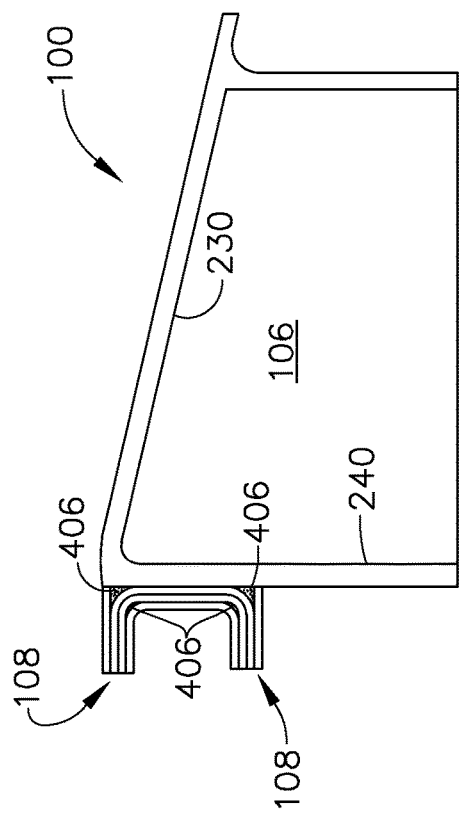

According to one embodiment, pins and staples may be incorporated into angel wing and skirt designs. For example, as shown in FIGS. 7a-c pins may be incorporated into angel wing 108 and skirt 110 designs. Pin 700 may be a small pin or a pin 700 that runs the length or partial length of shank 106 as shown in FIG. 7c. Pins 700 may be flush with surface as shown in FIG. 7a or pushed into a partial depth of shank 106 surface as shown in FIG. 7b. As shown in FIG. 8a-c staples 800 may be incorporated into angel wing 108 and skirt 110 designs. Pins 700 and staples 800 may be fabricated from a metal, a metallic alloy, carbon fibers or rods, a ceramic, a ceramic composite, or a combination thereof.

According to one embodiment, CMC components with designs that require multiple angel wings 108 and skirts 110 to be retained by the disk (not shown) may be manufactured. For example, as shown in FIGS. 9a-e, CMC components 100 with designs that require multiple angel wings 108 and skirts 110 to be retained by the disk (not shown) may be manufactured. Additional angel wings 108 and skirts 110 are applied to existing component 900 on side of shank 106 beneath existing angel wing 108.

Figure 10B:
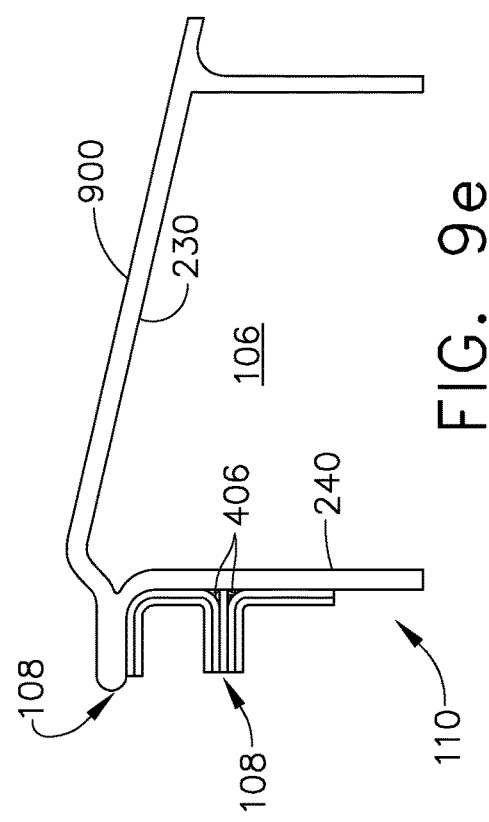
Figure 10A:
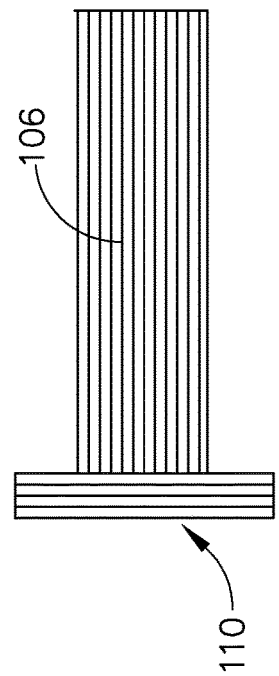

According to one embodiment, CMC components with designs that require multiple angel wings and skirts, but allow them to be unretained by the disk (not shown), may be manufactured by applying the multiple angel wings and skirts to side of shank. For example, as shown in FIG. 10a-b CMC components 100 with designs that require multiple angel wings and skirts, but allow them to be unretained by the disk (not shown), may be manufactured by applying the multiple angel wings 108 and skirts to side of shank 106.

Figure 11A:
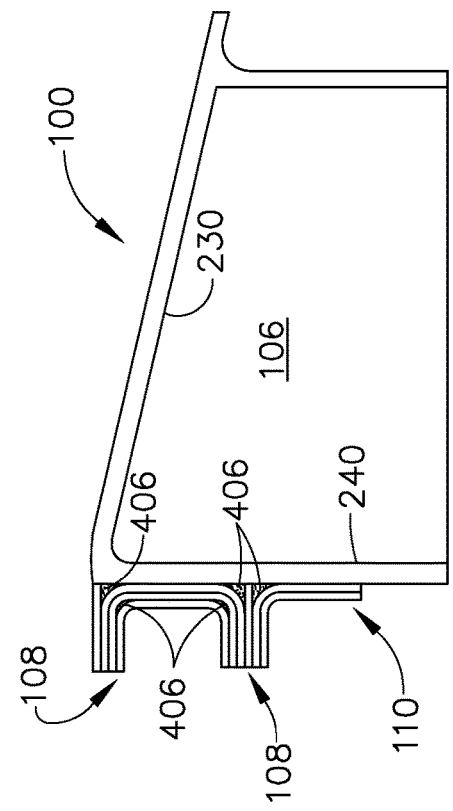
Figure 12B:
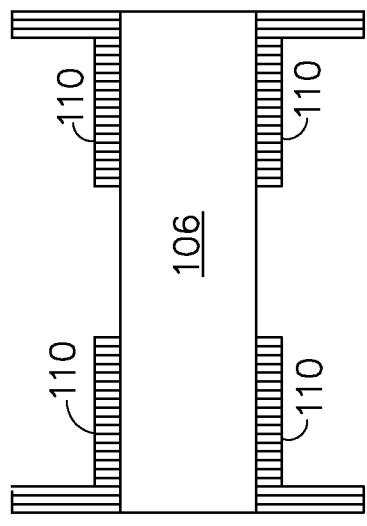
Figure 12D:
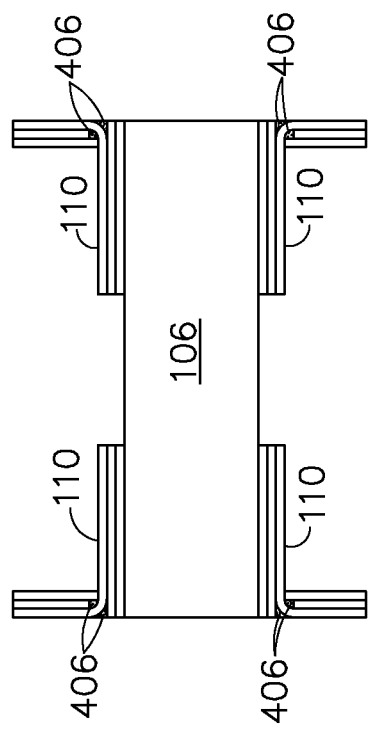
Figure 12A:
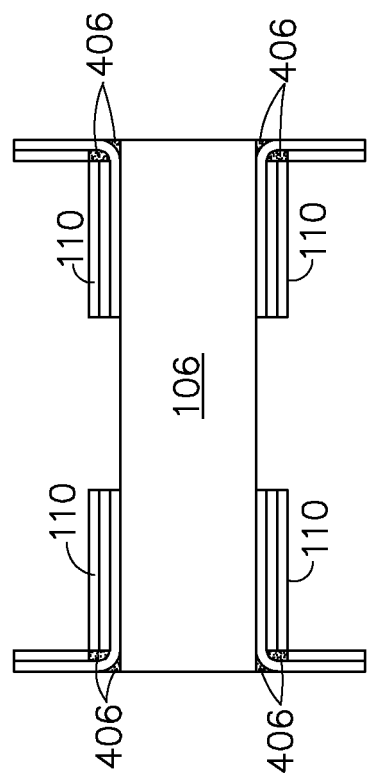
Figure 12C:
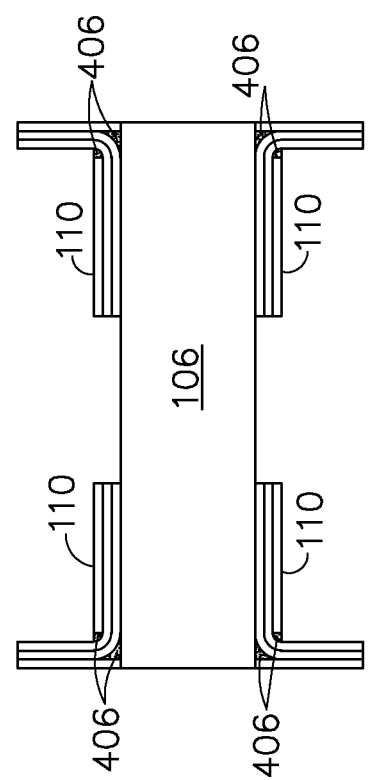
Figure 13A:
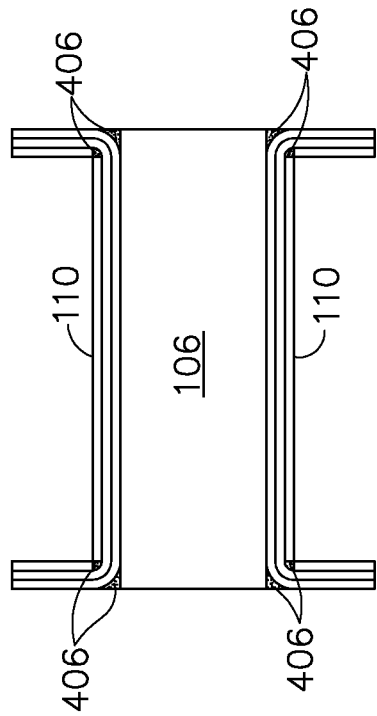
Figure 13B:
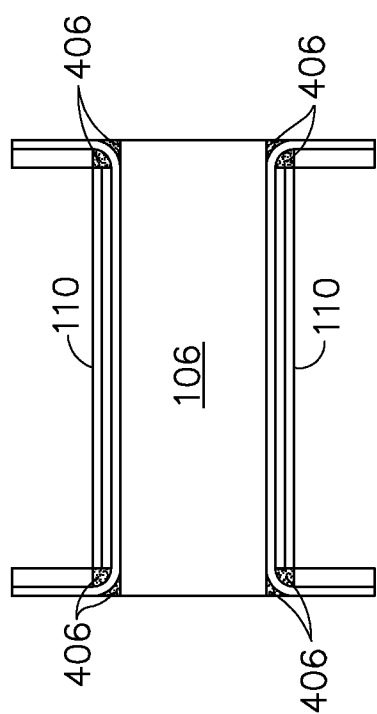
Figure 13C:
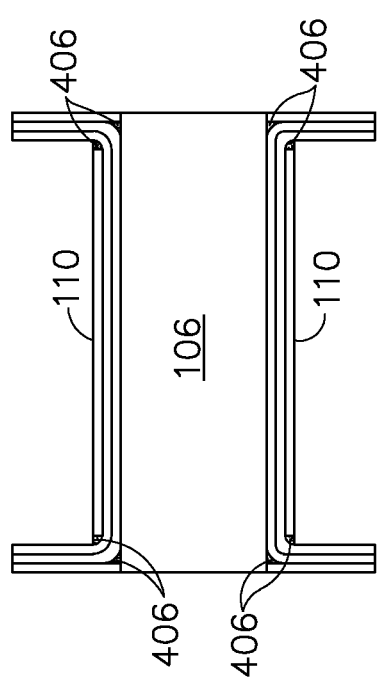
Figure 13D:
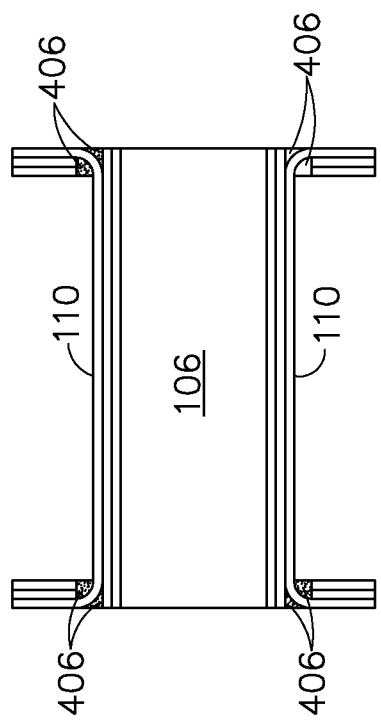
Figure 14A:
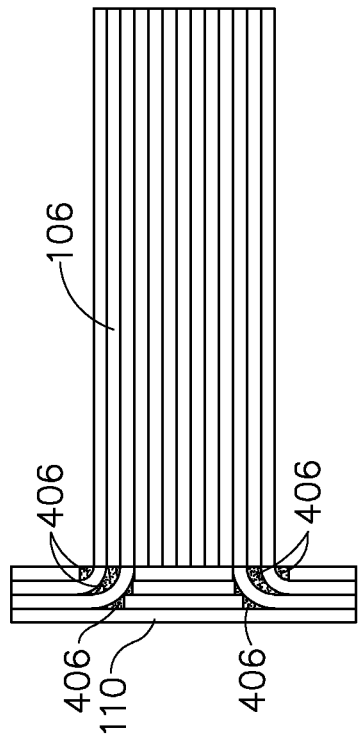
Figure 14B:
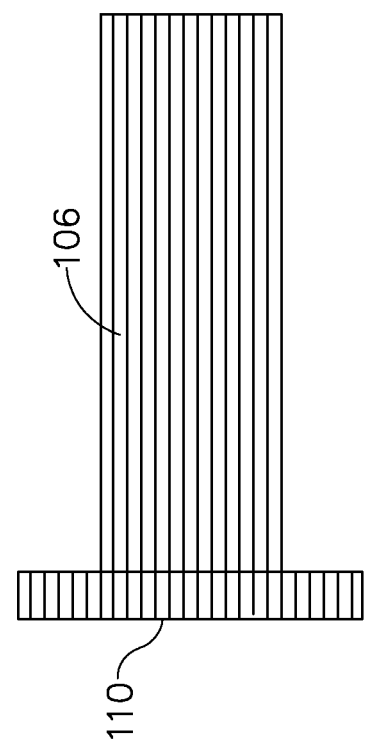
Figure 14C:
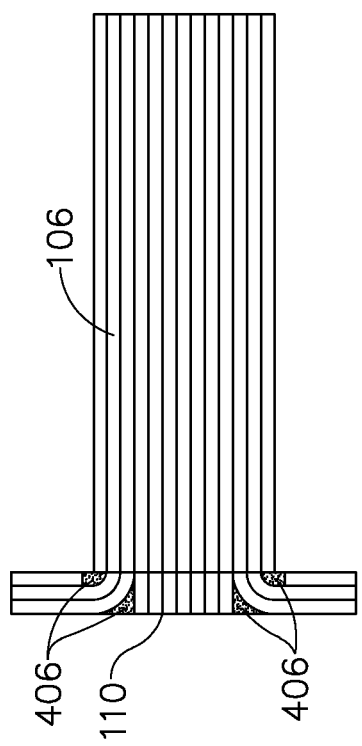
Figure 14D:
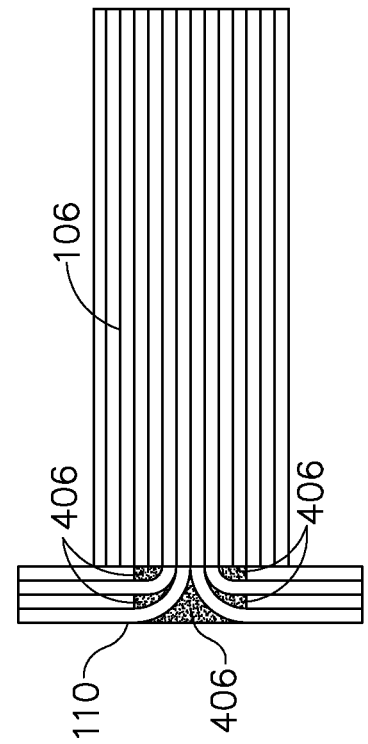

According to one embodiment, skirt may be laminated to shank and skirts may be formed by laminating L or C-shaped brackets to the shank. FIG. 11a is a cross-section cut view of FIG. 1 of a CMC component 100 of the present disclosure. For example, as shown in FIG. 11a, skirt 110 may be laminated to shank 106. For example, as shown in FIGS. 12a-12d and FIGS. 13a-13d skirts may be formed by laminating L- or C-shaped brackets to shank 106. FIGS. 12a-12 show L-shaped skirts 110 and a number of different orientations that may be used to apply skirt. FIGS. 13a-13d show C-shaped skirts 110 and a number of different orientations that may be used to apply skirt 110.

According to one embodiment, skirts may be formed using shank plies that are extended and curled into the skirt shape. For example, as shown in FIGS. 14a-14d skirts 110 may be formed using shank 106 plies that are extended and curled into the skirt 110 shape.

According to one embodiment, skirts may be formed using a combination of the above discussed methods. For example, as shown in FIGS. 15a-b skirts 110 may be formed using a combination of the above discussed methods.

According to one embodiment, angel wing and skirt may not be rooted to aft face of shank. For example, as shown in FIG. 16a, which is a side view of CMC component 100, angel wing 108 and skirt 110 may not be rooted to face 1600 of shank 106.

According to one embodiment, angel wing and skirt may be incorporated into rotor assembly hardware such as the forward or aft retainer. For example, as shown in FIGS. 17a-d, angel wing 108 and skirt 110 may be incorporated into rotor assembly hardware such as the forward or aft retainer. Disk 1702 is shown for reference. Additionally, as shown in FIG. 17b, a coating 1700, such as a thermal barrier coating (TBC) or environmental barrier coating (EBC) may be applied to angel wing 108 and portion that are exposed to hot gases.

Figure 18:
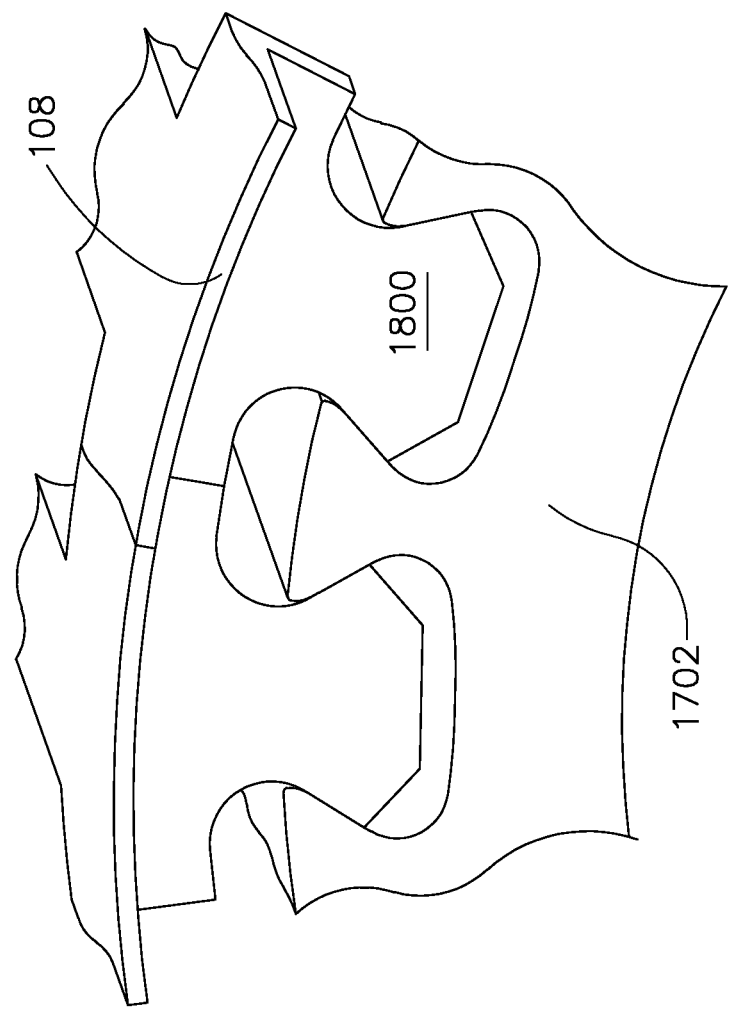
FIG. 18 is perspective view of an angel wing of the present disclosure.

According to one embodiment, angel wing and skirts may be retained by disk using dovetails that are not used to support shank. For example, as shown in FIG. 18, angel wing 108 and skirts 110 may be retained by disk 1702 using dovetails 1800 that are not used to support shank and are not attached to shank. In one embodiment, angel wing 108 and skirt 110 may come into friction contact with the shank. In this embodiment, angel wing 108 and skirt 110 are constructed independently from CMC component 100.

According to one embodiment, a method of forming angel wings for ceramic matrix composite components is provided. The method may include providing a shank of the component. The method may include applying at least one composite layer to a top portion of shank, where the shank transitions to airfoil, or at the shank airfoil transition point. The method may include applying at least one composite layer to a side, forward or aft side, of the shank. The composite layers may form an angel wing on the shank of the component.

According to one embodiment, a method of forming skirts for ceramic matrix composites is provided. The method may include providing a shank of the component. The method may include applying at least one composite layer to a forward or aft side of the shank. The composite layers may form a skirt on the shank of the component.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine blade sealing structure for a ceramic matrix composite component comprising:

at least one top ply abutting a top portion of a shank, the at least one top ply extending out over the top portion of the shank;

at least one side ply abutting a side portion of the shank, the at least one side ply extending along a side portion of the shank;

at least one of a spacer or an insert pack of plies between the at least one top ply and the at least one side ply; and at least one laminate, wherein the at least one top ply, the at least one spacer or insert pack of plies, and the at least one side ply form an angel wing on the shank of the ceramic matrix composite component, the at least one spacer or insert pack of plies fully located within the angel wing such that the at least one spacer or insert pack of plies terminates before the top portion and side portion of the shank, and wherein the at least one side ply and the at least one laminate form a skirt on the shank of the ceramic matrix composite component, wherein the at least one laminate is separate from the angel wing.

2. The turbine blade sealing structure of claim 1, wherein the at least one top ply is a continuous ply, wherein the at least one laminate comprises at least one C-shaped bracket, the C-shaped bracket comprising two 90-degree intersections.

3. The turbine blade sealing structure of claim 1, wherein the at least one top ply is a terminal ply.

4. The turbine blade sealing structure of claim 1, wherein the at least one top ply is weaved.

5. The turbine blade sealing structure of claim 1, wherein the at least one top ply is braided.

6. The turbine blade sealing structure of claim 5 further comprising matrix surrounding the at least one top ply.

7. The turbine blade sealing structure of claim 1, wherein the at least one top ply is formed from the group consisting of silicon carbide fiber reinforced ceramic matrix composites, carbon fiber reinforced ceramic matrix composites, alumina or alumina-silicate fiber reinforced oxide matrix composites, or combinations thereof, and wherein the turbine blade sealing structure comprises multiple angel wings.

8. The turbine blade sealing structure of claim 1, wherein the at least one side ply is a continuous ply.

9. The turbine blade sealing structure of claim 1, wherein the at least one top ply and at least one side ply is a wrapping ply.

10. The turbine blade sealing structure of claim 1, wherein the at least one side ply is a terminal ply.

11. The turbine blade sealing structure of claim 10, wherein the at least one side ply is weaved.

12. The turbine blade sealing structure of claim 1, wherein the at least one side ply is braided.

13. The turbine blade sealing structure of claim 12 further comprising matrix surrounding the at least one side ply.

14. The turbine blade sealing structure of claim 1, wherein the at least one side ply is formed from the group consisting of silicon carbide fiber reinforced ceramic matrix composites, carbon fiber reinforced ceramic matrix composites, alumina or alumina-silicate fiber reinforced oxide matrix composites, or combinations thereof.

15. The turbine blade sealing structure of claim 1 wherein the at least one of a spacer or an insert pack of plies is a spacer between the at least one top ply and the at least one side ply, and wherein at least one continuous ply wraps around the spacer to form at least a portion of the angel wing.

16. The turbine blade sealing structure of claim 1 wherein the at least one of a spacer or an insert pack of plies is an insert pack of plies between the at least one top ply and the at least one side ply, and wherein at least one continuous ply wraps around the insert pack of plies to form at least a portion of the angel wing.

17. The turbine blade sealing structure of claim 11 further comprising pins or staples.

18. The turbine blade sealing structure of claim 17, wherein the at least one laminate is bonded to a flat portion of the side portion of the shank.

19. The turbine blade sealing structure of claim 18 further comprising;
- multiple angel wings,
- wherein said pins or staples run the length of the shank, and
- wherein the at least one laminate comprises an L-shaped bracket.

20. The turbine blade sealing structure of claim 1, wherein the at least one laminate is bonded to a flat portion of the side portion of the shank.

\* \* \* \* \*